UNITED STATES PATENT OFFICE.

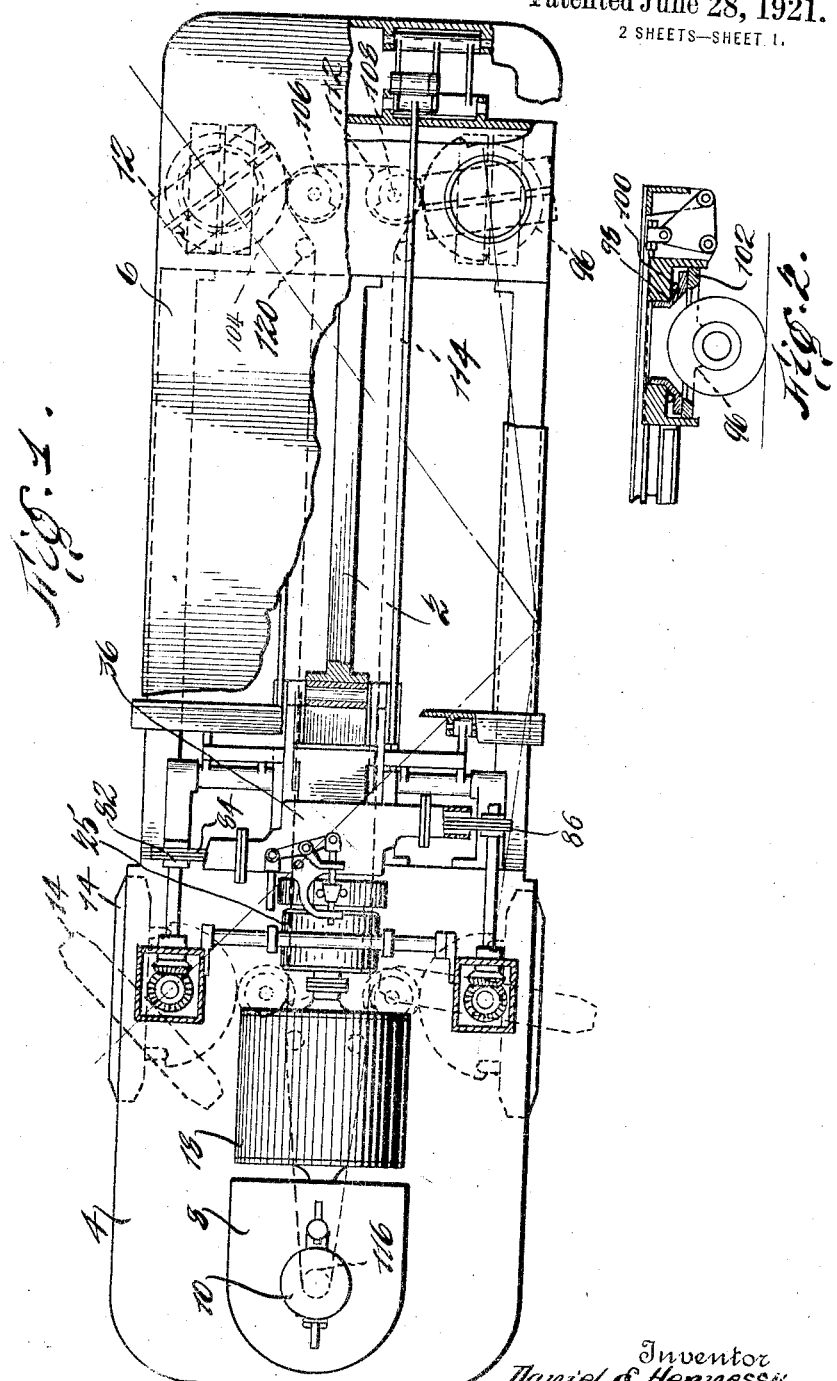

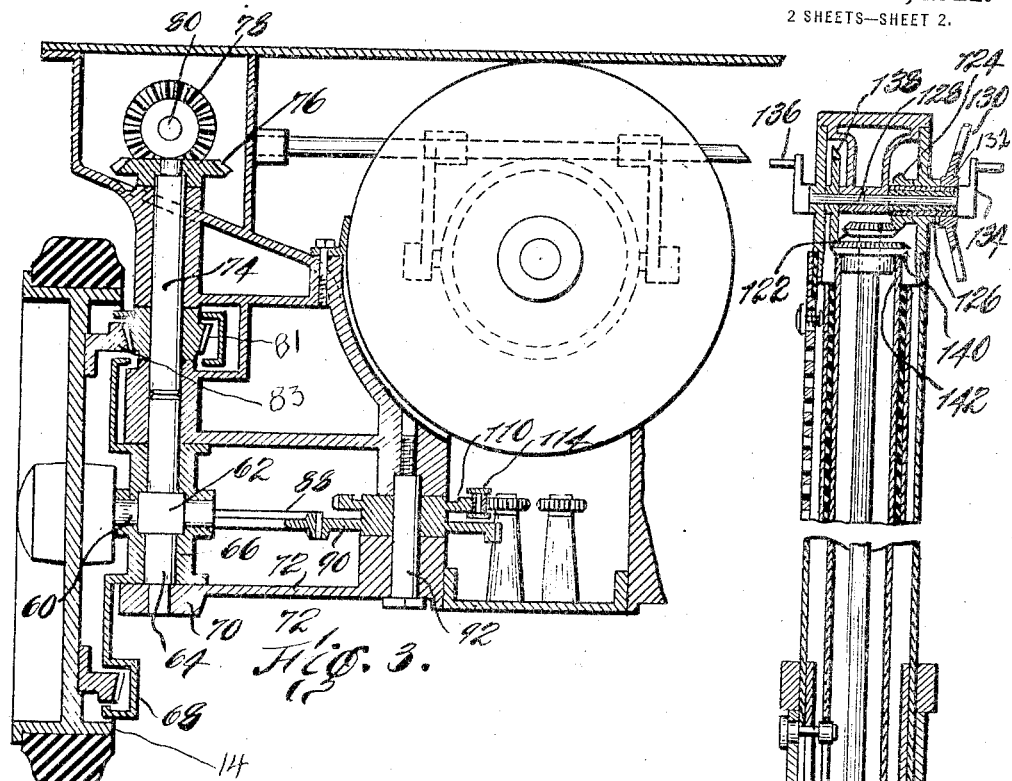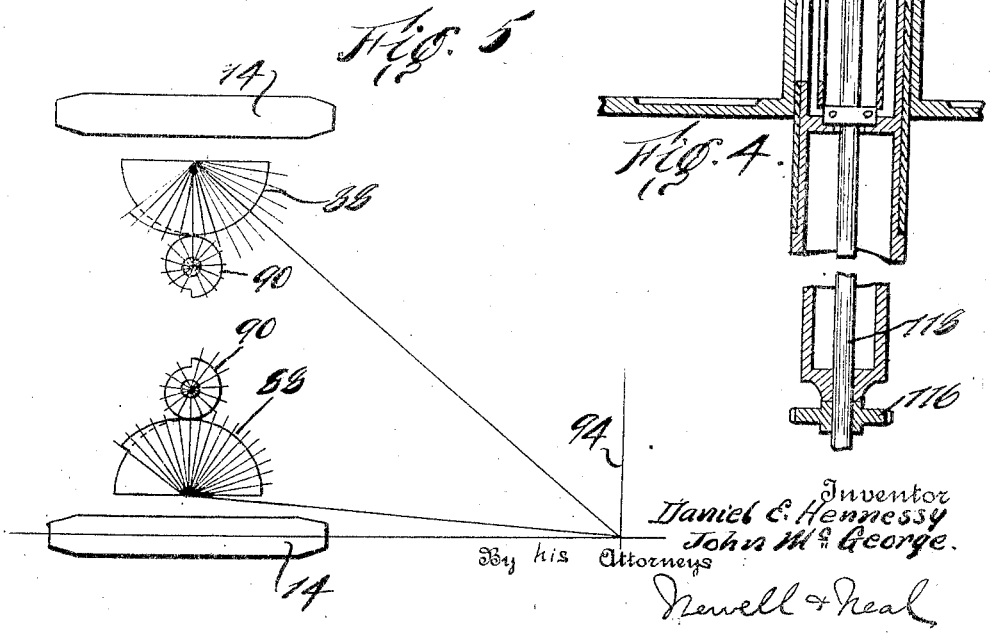

DANIEL E. HENNESSY, OF HOLYOKE, MASSACHUSETTS, AND JOHN McGEORGE, OF CLEVELAND, OHIO, ASSIGNORS TO HERBERT W. COWAN J. LEWIS WYCKOFF, AND EDWARD N. WHITE, ALL OF HOLYOKE, MASSACHUSETTS, TRUSTEES, DOING BUSINESS AS COWAN TRUCK COMPANY.

VEHICLE STEERING MECHANISM.

1,382,909.   Specification of Letters Patent.   Patented June 28, 1921.

Original application filed March 23, 1917, Serial No. 157,017. Divided and this application filed October 3, 1917, Serial No. 195,240. Renewed January 8, 1921. Serial No. 435,991.

*To all whom it may concern:*

Be it known that we, DANIEL E. HENNESSY and JOHN McGEORGE, citizens of the United States, residing at Holyoke, county of Hampden, and State of Massachusetts, and at Cleveland, Ohio, respectively, have invented certain new and useful Improvements in Vehicle Steering Mechanism, of which the following is a clear, full, and exact description.

This invention relates to self-propelled vehicles, and particularly to self-propelled vehicles of the type used in warehouses and railroad stations for carrying goods and baggage from place to place. The invention is herein shown as embodied in an electrically propelled elevating truck of the type shown in our co-pending application Serial No. 157,017 filed March 23, 1917 for Letters Patent for improvements in electrically operated elevating platform trucks, of which application the present application is a division, but it will be understood that the invention is not restricted to use in vehicles of the type shown in our co-pending application but is of general applicability in the art to which it relates.

A particular object of the invention is so to improve the steering mechanism of self-propelled vehicles that not only may the ideal steering conditions be obtained so far as location of the steering wheels on tangents of concentric circles is concerned, but the range of the steering movement may also be increased whereby the vehicle may be completely turned in the smallest possible space. In the preferred embodiment of the invention, the improvements relating to the steering of the vehicle are applied to all four wheels of the vehicle and all four wheels are arranged to travel on tangents to concentric circles having their common center between the ends of the truck. It will be understood, however, that many of the advantages of the improved steering construction can be obtained in a vehicle having only two of the wheels arranged for steering.

Other objects and important features of the invention will appear from the following description and claims when considered in connection with the accompanying drawings, in which—

Figure 1 is a plan view of a truck embodying the invention, with parts broken away to show parts otherwise concealed, and with parts also shown in section;

Fig. 2 is a sectional detail elevation of the rear end of the truck;

Fig. 3 is a sectional detail through one of the combined steering and driving wheels and through the parts associated therewith, illustrating the steering and driving connections;

Fig. 4 is a vertical section through the steering and controlling post; and

Fig. 5 is a diagrammatic view illustrating the lay-out of the steering gears.

The illustrated truck comprises a low horizontal frame 2 connected at its forward end to the frame or casing 4, which carries the electrically operated propelling mechanism of the vehicle and the mechanism by which the elevating platform 6 is raised, all of which are more fully shown and described in the co-pending application hereinabove referred to. At the front of the frame or casing 4 is a platform 8 which carries the steering and controlling post 10, the parts thus far described being supported upon four wheels, or sets of wheels, comprising pairs of combined supporting and steering wheels 12 beneath the platform 6 and combined steering and driving wheels 14 beneath the elevated portion of the truck frame.

The power for driving the truck and for operating the elevating mechanism is preferably received from storage batteries, not shown, mounted upon the frame 4, and is applied through an electric motor 18 which may be clutched by suitable clutch mechanism 25, either to the driving wheels 14 or to mechanism, not herein particularly illustrated, for raising the platform 6. The connection between the motor 18 and the driving wheels comprises a differential gearing, not shown, which is housed in a casing 36 and is connected by sprocket chains 84 and 86, hereinafter more fully described, to gearing by which the driving wheels 14 are turned.

The driving wheels 14 are mounted on stub axles or spindles 60 having squared body portions 62 confined upon vertical spindle shafts 64, the body 62 and shaft 75 being confined in extensions 66 of the gear housings 68, the ends of the shafts 64 being confined in bearings in the forked ends 70 of the axle 72 and the extensions 66 of the housings 68 fitting within these forked ends.

The frame or casing 4 into which the upper part of each wheel 14 extends is so recessed upon each side of the axle 72 that the wheel may turn with its spindle 60 about the bearing of the spindle shaft 64 through an angle of nearly 90° upon one side of the axle and through an angle sufficient to permit the coöperation of each steering wheel with the other when the other is being turned through its greater angle, the limit of the turning movement being shown in dotted lines in Fig. 1 of the drawings.

Mounted in bearings above the spindle shaft 64 and coaxial with said shaft is a pinion shaft 74 having at its upper end a bevel pinion 76 meshing with a bevel pinion 78 on a horizontal shaft 80 extending lengthwise of the vehicle. The shaft 80 carries a sprocket wheel 82, which is driven from the differential by means of a sprocket chain 84, there being a corresponding driving mechanism upon the other side of the vehicle, connected by a sprocket chain 86 to the differential. A pinion 81 on the shaft 74 meshes with the gear ring 83 on the driving wheel 14.

In order to keep the steering wheels tangential to concentric circles, thus producing the ideal steering condition for a driven vehicle, the steering mechanism now to be described is provided. Connected to the gear housing 68 of each of the driving and steering wheels 14 is a gear segment 88 which is not wholly concentric with the axis of the spindle shaft 64 and which does not have its gear teeth arranged upon the arc of a single circle. This gear segment meshes with a somewhat spiral-shaped gear 90 upon a vertical stud shaft or bolt 92 in the axle 72, the curvature of this gear being such that it meshes with the gear segment 88 throughout the range of steering movement of the steering and driving wheel 14. The curves of the segments 88 and gears 90 are so plotted that when the gears 90 are turned in opposite rotational directions and through equal angles about their axes, the steering wheels will be moved by the gear segments 88 into tangential relation to concentric circles, these circles in the illustrated construction having their common center upon a line of centers 94, located substantially midway between the front and rear wheels of the truck.

The rear wheels 12 of the truck are preferably also arranged to be steered, and to this end each of these wheels is mounted in a wheel support 96 having a swivel connection with the horizontal frame 2, the illustrated swivel comprising a bearing cone 98 resting against ball bearings 100 in a ball race in the frame 2, said bearing cone being confined in the frame by means of a ring 102. Each of the steering wheel supports 96 has connected therewith a gear segment 104 having the shape of the gear segment 88, and coöperating with each segment 104 is a gear 106 of substantially the shape of the gear 90, the gears 106 being mounted upon vertical stub shafts 108.

Mechanism is provided for operating all four of the steering wheels simultaneously and in such manner that all may be placed in tangential relation to concentric circles having their common center on the line of centers 94. It will be noted that there are two of the supporting wheels 12 in each of the wheel supports 96, but in describing the steering mechanism of the truck, each of these wheel couples will be considered as a single wheel, as in such expressions as "all four."

The illustrated mechanism for controlling the steering movements of the front and rear wheels simultaneously comprises a sprocket wheel 110 integral with each of the gears 90 and a sprocket wheel 112 integral with each of the gears 106, these sprocket wheels being connected by a continuous sprocket chain 114 which engages the nearer or inner sides of the gears 90 and the remote sides of the gears 106, and also passes over a sprocket wheel 116 on the lower end of a vertical steering shaft 118 in the steering and controlling post 10. Guide rollers 120 are located in front of the gears 106.

At its upper end the shaft 118 is provided with a bevel gear 122, which meshes with a bevel gear 124 upon a sleeve 126 surrounding the controller shaft 128, this sleeve being connected to the hub 132 of the steering wheel 130 and being mounted in bearings in the upper part of the steering and controlling post 10. The controller shaft 128 is provided at its respective ends with operating handles 134, 136, whereby the controller may be operated from either side of the post 10, the controller shaft 128 having attached thereto a bevel gear 138 which meshes with a bevel gear 140 on the controller sleeve 142. The electrical mechanism of the controller may be of any suitable or usual construction and in itself does not constitute a part of the present invention.

From the foregoing description and from an inspection of Fig. 1 of the drawings, it will be noted that when the steering handle is turned to effect the steering of the vehicle, all four of the steering wheels will be turned into tangential relation to concentric circles and in such manner as to effect the turning of the vehicle in the smallest space, the wheels all traveling in the same direction about the common center. When, as shown in Fig. 1 of the drawings, the wheels are turned to their extreme limit in any steering direction, the common center will lie substantially in one side of the truck.

What we claim as new is:—

1. In a truck of the class described, the combination with steering wheels, of means for driving said wheels, and means for turning said wheels into tangential relation to concentric circles, comprising eccentric gear segments connected to said wheels and a gear coöperating with each gear segment throughout the steering movement of the wheel, said gear being arranged to turn about a fixed axis.

2. In a vehicle of the class described, the combination with a pair of steering wheels, of means for turning said steering wheels into tangential relation to concentric circles, comprising a horizontal gear segment carried by each wheel and a coöperating gear upon the frame for each gear segment, the teeth of the coöperating gears upon each side being arranged to mesh throughout the steering movement of the steering wheel and being arranged upon curves plotted to maintain said wheels in tangential relation to concentric circles for equal angular movements of the operating gears.

3. In a vehicle of the class described, the combination with a pair of steering wheels, of means for effecting simultaneously steering movements of said steering wheels, said means comprising a pair of operating gears arranged to turn in opposite directions and coöperating gears carried by the respective wheels, the intermeshing teeth of said respective sets of coöperating gears being arranged upon curves plotted to maintain said steering wheels in tangential relation to concentric circles for all equal angular movement of said operating gears, and means for effecting simultaneously equal angular movements of said operating gears.

4. In a vehicle of the class described, the combination with front and rear pairs of steering wheels, of means for effecting simultaneously movement of all of said steering wheels into tangential relation to concentric circles and into position to travel in the same direction about the common center, said means comprising an operating gear for each steering wheel and a coöperating gear upon each steering wheel, the intermeshing teeth of the respective pairs of coöperating gears being arranged upon curves so plotted with respect to the locations of the steering wheels that equal angular movements of all of the operating gears will move all of said steering wheels into tangential relation to concentric circles, and means for so turning said operating gears simultaneously as to move said steering wheels into position to travel in the same direction about the common center.

DANIEL E. HENNESSY.
JOHN McGEORGE.